Figure 1:
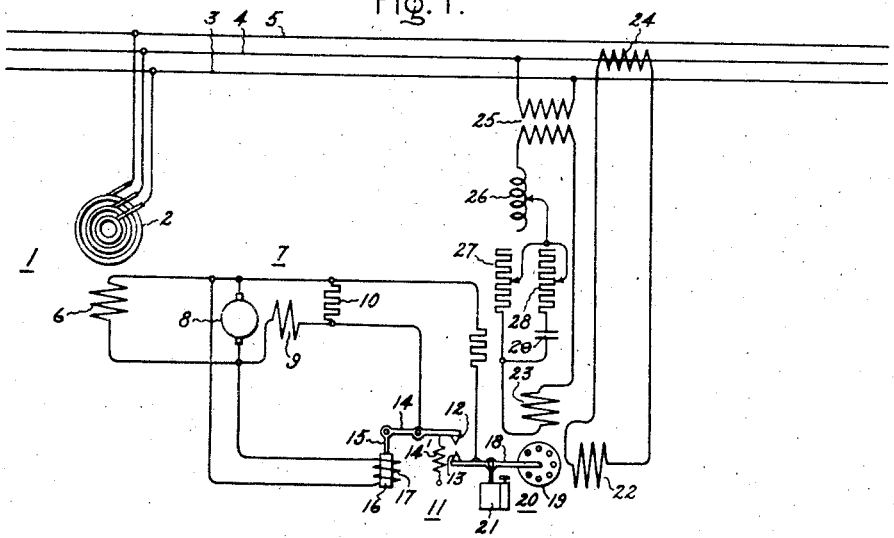

Feb. 7, 1933.  L. W. THOMPSON  1,896,855
ELECTRICAL REGULATOR
Filed June 7, 1930

Inventor:
Louis W. Thompson,
by Charles E. Mullen
His Attorney.

Patented Feb. 7, 1933

1,896,855

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

ELECTRICAL REGULATOR

Application filed June 7, 1930. Serial No. 459,776.

My invention relates to electrical regulators and particularly to regulators for holding constant the power factor of alternating current electrical apparatus.

The conception of power factor involves a distinction between watts and volt-amperes. With direct currents no distinction ordinarily exists but with alternating currents there is an important distinction, due to the fact that alternating currents are often out of time phase with the voltages producing them. When such a situation exists the volt-amperes equal the arithmetical product of the current and the voltage producing it while the watts equal the product of the voltage and the component of the current produced by this voltage which is in phase with this voltage. Power factor may be defined as the ratio of the watts or actual power to the volt-amperes or apparent power. When these two quantities are equal, unity power factor is said to exist and the current and voltage are in time phase with each other.

Alternating current apparatus for power purposes is usually rated in volt-amperes, or more often in thousands of volt-amperes, rather than in watts, or actual power, because it is the former which is the limiting factor in the operation and size of any given machine. This is because the insulation requirements are fixed by the maximum numerical value of the voltage while the conductor sizes are limited by the maximum numerical value of the current, regardless of the time phase relation between these quantities.

It is therefore clear that in order to make the most of the investment represented by any given machine or to utilize a given space, when space is at a premium, to the best advantage, requires that the alternating current machinery, such as dynamo electric machines, should operate at maximum or unity power factor, for only then are the out of phase voltage or current components, which are useless for power purposes, reduced to zero. This latter feature of space economy is of importance in the design and construction of electric locomotives for in such cases the physical size is limited by previously fixed clearances.

As alternating current dynamo electric machines, synchronous machines in particular, inherently tend to operate at different power factors under different loads it is necessary to provide regulators for holding them at a given power factor if constant power factor under variable loads is desirable. Power factor regulators for producing this result have been devised in the past and several different types are known in the art.

In accordance with my invention I provide a novel and extremely simple power factor regulator which operates on the principle of magnetic induction, a moving magnetic field of opposite directions being produced by departures from a given value, in different directions respectively, of the power factor of an alternating current electric circuit or alternating current dynamo-electric machine.

While I have stressed the importance of operating certain alternating current machines at unity power factor it should be understood that my invention is not limited to producing such a result and that by proper adjustment any value of power factor may be maintained. This is of advantage in some cases, as when it is desired to operate synchronous motors over excited so as to take a leading current which neutralizes the lagging current of a system thereby to improve the power factor of the system as a whole.

An object of my invention is to provide a new and improved power factor regulator.

Further objects will appear to those skilled in the art as the description of my invention proceeds.

My invention will be better understood from the following description taken in connection with the accompanying drawing and its scope will be pointed out in the appended claims.

Figure 2:
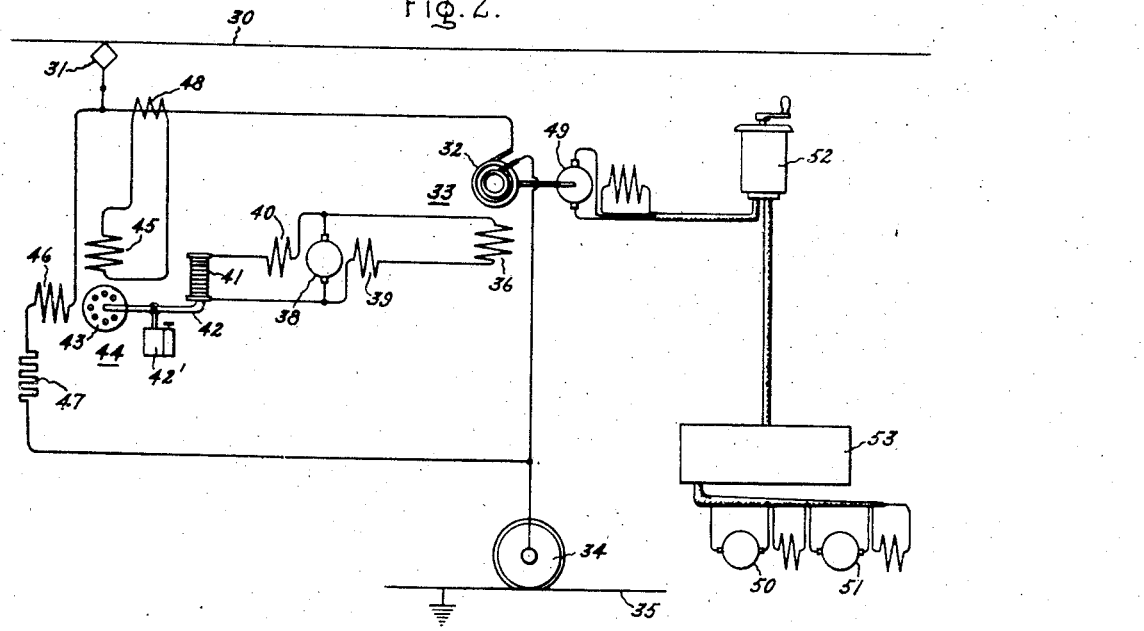

In the drawing Fig. 1 is a diagrammatic showing of an embodiment of my invention as applied to a polyphase synchronous machine while Fig. 2 is a similar showing of a modification which is applied to the single phase synchronous motor of an electric locomotive.

Referring now to Fig. 1. Character 1 designates a polyphase alternating current dynamo electric machine, such as a synchronous motor, having a three phase armature 2 connected to a three phase circuit comprising conductors 3, 4 and 5, and a field winding 6 energized by any suitable source, such as an exciter 7. This exciter has an armature 8 across whose terminals are connected winding 6 and its own field winding 9, a regulating resistance 10 being in series with the latter.

A regulator 11, operating on the well known Tirrill principle, operates to intermittently short circuit resistance 10 so as to maintain various effective values of resistance 10 to thus hold various average excitations of machine 1 depending upon the position of its main control element. As shown, the terminals of resistance 10 are connected to contacts 12 and 13, the former being moved by the anti-hunting system comprising pivoted levers 14 and 15, a core 16 and coil 17 connected across the terminals of the exciting generator. A spring 14' opposes the pull of coil 17 on core 16. Contact 13, which is the main control contact, is moved by lever 18 which is fastened transversely to the axis of rotation of the movable element or inductor armature 19 of my novel power factor responsive control element 20. A dash pot 21 serves to check any tendency of lever 18 to vibrate.

Control element 20 is shown as a torque motor whose relative arrangement of stator windings and rotor is very similar to that of the conventional two phase or quarter phase induction motor. Its rotor 19, whose axis of rotation is perpendicular to the plane of the drawing, may be either the wound type or the squirrel cage type, the latter type being illustrated by the conventional symbol. The stator is provided with two separate windings 22 and 23 whose axes are in quadrature. One of these windings, 22 as shown, is connected to carry a current which varies in accordance with variations in the current in one of the conductors of the polyphase circuit. This connection is preferably made through a current transformer 24 so that winding 22 need not carry full line current. As shown, the transformer is connected in conductor 4 although it might equally well be connected in either of the other conductors of the circuit. Winding 23 is connected to carry a current which varies in accordance with one of the line voltages of the circuit to which machine 1 is connected. As shown this is accomplished by means of a potential transformer 25 connected between conductors 3 and 4 although it might be connected between any two of the conductors or even between any one of the conductors and ground if the circuit is part of a grounded neutral system. The potential transformer 25 is of value in that it reduces the insulation requirements of motor 20. In the circuit of either one of the windings 22 or 23, shown as in that of winding 23, are adjustable inductance, capacitance and resistance means for varying the phase relation between the fluxes produced by the windings 22 and 23. As shown these means comprise a variable series reactance 26, a pair of parallel connected variable series resistances 27 and 28, in series with one of which is a capacitance 29.

The operation of the embodiment of my invention illustrated in Fig. 1 is as follows. Assume that the circuit comprising conductors 3, 4 and 5 is being energized from any suitable constant voltage source (not shown) and that motor 1 is connected to a variable load (not shown). It is well known that when the voltage remains constant, the excitation of a synchronous motor must be changed at each change in load if constant power factor is to be maintained. In general the excitation must be decreased as the load increases from no load up to a predetermined value of load, usually a relatively low value, and then increased as the load increases beyond this value. The reason that the excitation must be decreased as the load increases through its lower values is that as the power factor is constant the phase angle between the motor current and the vector rise in voltage across the terminals of the motor remains constant, thus fixing the angle between this voltage and the synchronous impedance voltage drop in the machine. Now at no load the excitation, or internal, voltage of the machine and the external voltage rise across the terminals of the machine virtually coincide, as the synchronous impedance voltage drop is due only to the small no load current, but as the load increases the external voltage rise and the internal or excitation voltage separate due to the increasing synchronous impedance voltage drop, the excitation voltage and hence the excitation actually decreasing in magnitude as the angle between the external and excitation voltages increases until a minimum value is reached when the excitation voltage becomes normal to the synchronous impedance voltage drop, after which the excitation voltage, and hence the excitation, increases as the load increases.

As the axes of the stator windings 22 and 23 make an angle with each other, a difference in phase of the currents traversing them will produce a rotating magnetic field in a manner which is well known to those skilled in the art, while if the currents traversing them are in phase with each other no rotating field can be produced regardless of the space relation of the windings. This rotating magnetic field will act on rotor 19 to induce currents therein and these currents will react on the rotating field to produce a torque, the action being the same as that which takes place in the ordinary induction motor. While I have shown and described my power factor responsive element as producing a rotating magnetic field it will of course be apparent to those skilled in the art that my invention is not so limited and that, for example, the stator windings might have their axes parallel to each other, the rotor being an inductor armature like that of the usual induction watthour meter, without departing from my invention in its broader aspects.

If the three phase source of current supply for operating motor 1 has a grounded neutral and if voltage responsive winding 23 were connected to be responsive to the voltage between ground and conductor 4, this voltage would at unity power factor be in phase with the current in conductor 4 and hence no torque would be produced by element 20 under these conditions, while if this current lags or leads this voltage torques in opposite directions will be produced. However, as the grounded neutral is not always employed the winding 23 is shown connected to be responsive to one of the line voltages of the three phase circuit. At unity power factor with these connections the voltage between conductors 3 and 4 and the current in conductor 4 will not be in phase, the phase angle depending upon the phase rotation of the three phase voltages and whether the windings of the source are star or mesh connected. Assuming, for example, a star connection and a phase rotation of the line voltages in the order 3—4, 4—5, 5—3, the voltage 3—4 will at unity power factor be leading the current in conductor 4 by thirty degrees. It is in order to compensate for this that reactance 26 is inserted in the circuit of voltage winding 23 for by adjusting this reactance to the proper value, the current in winding 23 may be made to lag its voltage enough to bring it into phase with the current in winding 22. The resistances 27 and 28 and condenser 29 are employed to regulate the current in winding 23, and even to cause it to lead its voltage if desired, so that some other power factor than unity may be held or when other connections make it necessary for this current to lead its voltage in order that it be in phase with the current in winding 23 at unity power factor. Thus by increasing the value of resistance 27 and decreasing the value of resistance 28 the leading component of the current in winding 22 will be increased while by reversing these changes this component will be decreased. It should, of course, be understood that while I have shown a particular arrangement of connections of windings 22 and 23 to the three phase circuit that many other arrangements are possible, as by connecting current transformer 24 in any one of the other conductors or connecting potential transformer 25 across any other two of the conductors of the three phase circuit and that these connections could be made without departing from my invention in its broader aspects.

Assuming now that reactance 26 and resistances 27 and 28 are adjusted so that no torque is produced by element 20 at the particular power factor that it is desired to hold, unity power factor for example, and that windings 22 and 23 are so connected to their respective energizing circuits that if the current increases its angle of lag a clockwise torque is produced by element 20 while if the current increases its angle of lead a reverse torque is produced, it being obvious to those skilled in the art that the direction of rotation of the revolving field and hence the direction of the torque may be reversed, under given conditions of excitation by merely reversing the connections, or direction of winding, of one or the other of windings 22 and 23. Ignoring for the time being the action of the anti-hunting elements, that is, assuming that contact 12 is fixed and assuming also that a small load has just been placed on the previously unloaded motor 1 the following actions will take place. The motor will take a leading current as explained above, causing a counter-clockwise torque to be produced by element 20, thus causing contact 13 to descend with the result that contacts 12 and 13 are out of engagement, thus causing a minimum excitation of machine 1 because of the high resistance 10 in the field circuit of exciter 7. This decrease in excitation of machine 1 causes the power factor of machine 1 to swing in the other direction with the result that the motor will now take a lagging current, thus reversing the torque of element 20, resulting in engagement of contacts 12 and 13, thus short-circuiting resistance 10 and increasing the excitation of exciter 7 and hence the excitation of motor 1. It will then be seen that contacts 12 and 13 will intermittently engage and disengage with the result that the power factor of machine 1 will oscillate or swing on each side of the value, unity in this case, at which no torque is produced by element 20. This swinging or hunting action is due largely to the time constants of field winding 6, for if the field excitation of machine 1 responded without delay to the action of contacts 12 and 13 the hunting would be greatly minimized. As the load on motor 1 increases a point will be reached beyond which it will be necessary to increase the excitation of the machine in order to hold constant power factor and this will automatically be accomplished by the regulator for now as the load increases the current tends to lag causing engagement of contacts 12 and 13 and an increase in excitation of machine 1. The result will be that the ratio of the time of engagement of contacts 12 and 13 to the time of disengagement of these contacts increases. A decrease in load on motor 1 will result in a reversal of the above described steps.

Considering now the action of the anti-hunting elements. When the contacts 12 and 13 are in engagement the excitations of machines 7 and 1 increase with the result that the increased voltage of exciter 7 causes an increased pull by coil 17 thus overpowering spring 18 and disengaging the contacts. As soon as this disengagement occurs the voltage of exciter 7 falls, weakening the pull of coil 17 and again causing the engagement of contacts 12 and 13 through the pull of spring 18. If now contact 13 rises as a result of an increase in the angle of lag of the current taken by motor 1, contact 12 will vibrate about a new and higher mean position thus resulting in a new and higher mean excitation of machines 7 and 1. When unity power factor is reached the torque of element 20 becomes zero, contact 13 comes to rest and contact 12 vibrates rapidly to hold a new mean excitation. Thus for every position of contact 13, contact 12 will have a different mean position and hence the regulator will hold a different mean value of excitation. The action of the anti-hunting means is very much more rapid than would be the motion of contact 13 if contact 12 were fixed because the voltage of the exciter can be changed much more rapidly than the current in field winding 6. Hence the hunting produced by the regulator becomes negligible. It will thus be seen that whenever a change in power factor of motor 1 occurs, element 20 will move control contact 13 in a direction to change the excitation of this machine in such a way as to restore the power factor to its former value and when this occurs contact 13 will come to rest.

Referring now to the modification of my invention illustrated in Fig. 2, which shows an application of my invention to the synchronous motor of a single phase electric locomotive. In electric locomotives, as previously pointed out, space is at a premium and it is accordingly very desirable to operate the motor or motors at unity power factor under all conditions, so that as small a motor as possible for the power required may be used. In this figure, element 30 represents the overhead power supply conductor from which energy is collected through the pantograph 31, the current flowing through the armature 32 of the single phase synchronous motor 33 to the wheels 34 and thence to ground through the rail 35. Field winding 36 of motor 33 is energized from any suitable source, such as the compound wound exciter shown. This exciter has an armature 38, a series field winding 39 and a shunt field winding 40, in series with which is a variable resistance element shown as a carbon pile 41. This carbon pile is actuated by a lever 42 attached to the rotor 43 of a power factor responsive element 44, which is similar to element 20 of Fig. 1. A dash pot 42' serves to prevent too great an amplitude and speed of vibration of lever 42. The stator windings 45 and 46 of this element are connected to carry currents which vary in accordance with the current and voltage respectively of motor 33, although obviously they might be reversed if desired. A current limiting resistor 47 is in series with voltage winding 46 while current winding 45 is preferably energized through a current transformer 48.

The remaining elements of this figure represent the conventional electric locomotive equipment. Thus a direct current generator 49 is driven by motor 33 and this generator supplies energy to the traction motors 50 and 51. The usual controller 52 serves to change the connections of the motors and control the field excitation of generator 49. Box 53 contains the usual contactors and resistors.

The operation of the embodiment of my invention illustrated in Fig. 2 is as follows. Assume a suitable source of energy (not shown) to be connected between conductor 30 and rail 35. As windings 45 and 46 carry currents which vary with the current and voltage of a single phase circuit they will produce no rotating field at unity power factor and will produce reverse rotating fields depending upon whether the current is leading or lagging the voltage. Assume that these windings are so connected that rotor 43 and consequently arm 42 move counter-clockwise with a leading current. Thus a load change on motor 33 resulting in a lagging current will cause arm 42 to compress carbon pile 41 thus decreasing its resistance and increasing the shunt field current of the exciter and hence the excitation of motor 37. Similarly a load change on motor 33 resulting in a leading current being taken by it will cause an increase in resistance of pile 41 and hence a decrease in excitation of the motor. Under steady load conditions element 44 will hold such a mean or effective resistance of pile 41 that the power factor of motor 33 will be substantially unity, the dash pot 42' preventing too wide a variation in resistance 41.

While I have shown and described particular embodiments of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, an alternating current circuit, a power factor regulator connected thereto, said regulator including a plurality of spaced windings, one of said windings being connected to said circuit so as to carry a current which varies in accordance with the current in one of the conductors of said circuit, another of said windings being connected to said circuit so as to carry a current which varies in accordance with the voltage between a plurality of conductors of said circuit and a movable inductor armature associated with said windings, and arranged to be actuated by said windings in accordance with the power factor of said circuit, said armature being arranged to come to rest in any position when said coils do not produce a moving magnetic field..

2. In a power factor regulator, a control element consisting of a movably mounted inductor armature member, a current winding whose axis intersects said armature member, and a voltage winding whose axis intersects said armature member at an angle different from the angle of intersection of the axis of said current winding and said armature.

3. In combination, means for changing the power factor of alternating current apparatus and a power factor regulator having a control element consisting of a quarter phase induction motor operatively associated with said power factor changing means.

4. In combination, an alternating current circuit, a power factor regulator for association with said alternating current circuit having a control element consisting of a quarter phase induction motor whose stator windings are connected to be responsive respectively to a current and a voltage of said circuit.

5. In a power factor regulator, a power factor responsive element consisting of a current winding having a magnetic axis, a voltage winding having a magnetic axis at right angles to the axis of said current winding, whereby a rotating magnetic field is produced when the currents in said windings are out of time phase, and an inductor armature rotatably mounted in the magnetic field of said windings.

6. In combination, an alternating current circuit comprising a plurality of electrical conductors, a power factor regulator connected thereto, said regulator including a dynamo electric control element having a pair of stator windings whose axes are at right angles to each other and an inductor armature associated therewith, said armature being pivotally mounted and freely rotatable.

7. In a regulating system, an alternating current circuit, a quarter phase induction motor, means connecting one of the windings of said motor in said circuit, means connecting the other winding of said motor across said circuit, a regulating resistance and unbiased means associated with the rotor of said motor for varying the effective value of said resistance in accordance with the magnitude and direction of the torque of said motor.

8. In a power factor regulator, a power factor responsive element consisting of a quarter phase induction motor, means connecting one of the windings of said motor to be responsive to the magnitude and phase angle of the current of said circuit, means connecting the other winding of said motor to be responsive to the magnitude and phase angle of the voltage of said circuit, and variable impedance means in the circuit of one of said windings for adjusting the phase angle of its current with respect to the phase angle of the current in the other winding.

9. In a regulating system, in combination, an alternating current circuit, a synchronous dynamo-electric machine connected thereto, a pair of electromagnet coils, means connecting one of said coils in said circuit, means connecting the other coil across said circuit, said coils being so spaced relatively to each other that they produce a moving magnetic field when the currents in them are out of phase, and unbiased means responsive to variation in the direction of said moving field for varying the excitation of said synchronous dynamo-electric machine.

10. In a regulating system, in combination, a synchronous dynamo-electric machine, an alternating current circuit connected thereto, a regulator for varying the excitation of said machine in response to variations in its power factor, said regulator including a pair of coils for producing a moving magnetic field, means connecting one of said coils in said circuit, means connecting the other across said circuit, variable impedance means in the circuit of one of said coils and unbiased means responsive to the direction of motion of said rotating field for controlling the excitation of said synchronous machine.

11. In combination, a three phase alternating current circuit, a power factor regulator associated therewith, said regulator including a power factor responsive element consisting of a quarter phase induction motor, means connecting one of the stator windings of said motor in one of the conductors of said circuit and means connecting the other stator winding between two of the conductors of said circuit, and variable inductive means in the circuit of said last mentioned winding whereby when the power factor of said circuit is unity the currents in said windings may be made to be in phase with each other.

12. Adjusting means for a power factor regulator having a two winding induction motor power factor responsive element comprising a variable inductive reactance, a variable resistance and a capacitance in series with one of the windings of said element and a second variable resistance in parallel with said first mentioned variable resistance and said capacitance.

13. In combination, an alternating current supply circuit, a synchronous motor connected thereto, an exciter for the field winding of said synchronous motor, a resistance in the field winding circuit of said exciter, a vibratory contact type regulator having its contacts arranged to short circuit said resistance, a two phase induction motor, unbiased lever means connecting the rotor of said induction motor to one of the contacts of said regulator, means connecting one of the stator windings of said induction motor in one of the conductors of said circuit and means connecting the other winding of said induction motor between two of the conductors of said circuit.

In witness whereof, I have hereunto set my hand this 6th day of June, 1930.

LOUIS W. THOMPSON.